(12) United States Patent
Hugert

(10) Patent No.: US 9,744,494 B2
(45) Date of Patent: Aug. 29, 2017

(54) BACKING NET STRUCTURE

(71) Applicant: Camfil AB, Stockholm (SE)

(72) Inventor: Sverker Hugert, Trosa (SE)

(73) Assignee: CAMFIL AB, Stockholm (SE)

( * ) Notice: Subject to any disclaimer, the term of this patent is extended or adjusted under 35 U.S.C. 154(b) by 43 days.

(21) Appl. No.: 14/427,522

(22) PCT Filed: Sep. 21, 2012

(86) PCT No.: PCT/EP2012/068707
§ 371 (c)(1),
(2) Date: Mar. 11, 2015

(87) PCT Pub. No.: WO2014/044324
PCT Pub. Date: Mar. 27, 2014

(65) Prior Publication Data
US 2015/0290573 A1 Oct. 15, 2015

(51) Int. Cl.
*B01D 46/12* (2006.01)
*B01D 46/00* (2006.01)

(52) U.S. Cl.
CPC ....... *B01D 46/125* (2013.01); *B01D 46/0005* (2013.01); *B01D 46/0026* (2013.01); *B01D 2201/0415* (2013.01); *B01D 2265/04* (2013.01); *B01D 2265/06* (2013.01)

(58) Field of Classification Search
CPC  B01D 46/0005; B01D 46/0026; B01D 46/10; B01D 46/125; B01D 46/521; B01D 2265/04; B01D 2265/06; B01D 2201/0415
USPC .................................................. 55/499, 501
See application file for complete search history.

(56) References Cited

U.S. PATENT DOCUMENTS

| 2,857,017 | A | | 10/1958 | Nutting |
| 3,494,113 | A | | 2/1970 | Kinney |
| 4,364,751 | A | | 12/1982 | Copley |
| 4,732,675 | A | * | 3/1988 | Badolato ................ B01D 19/02 210/314 |
| 5,487,767 | A | | 1/1996 | Brown |
| 5,512,074 | A | | 4/1996 | Hanni et al. |
| 5,584,988 | A | | 12/1996 | Hashimoto et al. |
| 5,618,419 | A | | 4/1997 | Fuerst |
| 5,728,292 | A | | 3/1998 | Hashimoto et al. |

(Continued)

FOREIGN PATENT DOCUMENTS

| CN | 1668363 A | 9/2005 |
| CN | 1679994 A | 10/2005 |

(Continued)

OTHER PUBLICATIONS

International Search Report PCT/ISA/210 for International Application No. PCT/EP2012/068707 Dated Feb. 7, 2013.

(Continued)

*Primary Examiner* — Robert Clemente
(74) *Attorney, Agent, or Firm* — Harness, Dickey & Pierce, PLC

(57) ABSTRACT

A backing net for a filter media is disclosed. The backing net includes a plurality of longitudinal beams and at least one cross beam. The height of at least one of the longitudinal beams varies along the length of the longitudinal beam such that said height is reduced towards the first end thereof. A filter media and a V-type filter including such backing net are also disclosed.

13 Claims, 4 Drawing Sheets

(56) References Cited

U.S. PATENT DOCUMENTS

| | | |
|---|---|---|
| 6,248,155 B1 | 6/2001 | Seaman |
| 6,279,570 B1 | 8/2001 | Mittelstadt et al. |
| 6,447,566 B1 | 9/2002 | Rivera et al. |
| 6,485,538 B1 | 11/2002 | Toyoshima |
| 6,955,696 B1 | 10/2005 | Ost et al. |
| 2003/0085167 A1 | 5/2003 | Fox et al. |
| 2003/0145568 A1 | 8/2003 | Hodge |
| 2004/0074387 A1 | 4/2004 | Jaisinghani |
| 2004/0159598 A1 | 8/2004 | Fox et al. |
| 2004/0238434 A1 | 12/2004 | Fisher et al. |
| 2005/0217488 A1 | 10/2005 | Tanahashi et al. |
| 2006/0150816 A1 | 7/2006 | Jaisinghani |
| 2006/0163121 A1 | 7/2006 | Fisher et al. |
| 2006/0180534 A1 | 8/2006 | Fox et al. |
| 2007/0187303 A1 | 8/2007 | Fisher et al. |
| 2007/0204577 A1 | 9/2007 | Devine et al. |
| 2007/0204578 A1 | 9/2007 | Sundvik et al. |
| 2008/0045135 A1 | 2/2008 | Pfannenberg |
| 2009/0193773 A1 | 8/2009 | Sundvik et al. |
| 2010/0236203 A1 | 9/2010 | Suzuki et al. |
| 2010/0307118 A1 | 12/2010 | Kawano et al. |
| 2011/0067368 A1 | 3/2011 | Handley et al. |
| 2012/0011817 A1 | 1/2012 | Borkent et al. |
| 2012/0067013 A1 | 3/2012 | Antony et al. |
| 2012/0067323 A1 | 3/2012 | Patwardhan et al. |
| 2013/0067875 A1 | 3/2013 | Hartmann et al. |

FOREIGN PATENT DOCUMENTS

| | | |
|---|---|---|
| CN | 101229463 A | 7/2008 |
| CN | 101234276 A | 8/2008 |
| CN | 202398240 U | 8/2008 |
| CN | 201461157 U | 5/2010 |
| CN | 101868291 A | 10/2010 |
| DE | 2739815 A1 | 9/1978 |
| DE | 20002124 U1 | 4/2000 |
| DE | 102010016504 A1 | 10/2011 |
| EP | 0082106 A2 | 6/1983 |
| EP | 1582248 A1 | 10/2005 |
| ES | 2551876 | 11/2015 |
| GB | 2364256 A | 1/2002 |
| JP | H06262020 A | 9/1994 |
| JP | 2008253886 A | 10/2008 |
| WO | WO-0051712 A1 | 9/2000 |
| WO | WO-0160137 A1 | 8/2001 |
| WO | WO-0197946 A1 | 12/2001 |
| WO | WO-03013690 A1 | 2/2003 |
| WO | WO-2004069374 A1 | 8/2004 |
| WO | WO-2008001396 A1 | 1/2008 |
| WO | WO-2010151542 A2 | 12/2010 |
| WO | WO-2010151580 A1 | 12/2010 |

OTHER PUBLICATIONS

Chinese Office Action dated Dec. 3, 2015 issued in corresponding Chinese Application No. 201280075771.6 (with translation).
Chinese Search Report dated Nov. 10, 2015 issued in corresponding Chinese Application No. 201280075771.6.
Chinese Office Action dated Dec. 3, 2015 issued in corresponding Chinese Application No. 201280075763.1 (with translation).
Chinese Suppl. Search Report dated Aug. 5, 2016 issued in corresponding Chinese Application No. 201280075763.1.
Second Chinese Office Action dated Sep. 2, 2016 issued in corresponding Chinese Application No. 201280075763.1 (with translation).
Chinese Search Report dated Nov. 17, 2015 issued in corresponding Chinese Application No. 201280075763.1.
U.S. Office Action dated Oct. 4, 2016 issued in co-pending U.S. Appl. No. 14/427,522.
U.S. Office Action dated Oct. 6, 2016 issued in co-pending U.S. Appl. No. 14/427,584.
U.S. Office Action dated Nov. 4, 2016 issued in co-pending U.S. Appl. No. 14/427,392.
U.S. Appl. No. 14/427,584, filed May 15, 2015.
U.S. Appl. No. 14/427,609, filed Mar. 11, 2015.
U.S. Appl. No. 14/427,392, filed Mar. 11, 2015.
U.S. Appl. No. 14/427,605, filed Mar. 11, 2015.

* cited by examiner

BACKING NET STRUCTURE

CROSS REFERENCE TO RELATED APPLICATIONS

This is a National Phase Application of PCT/EP2012/068707 filed Sep. 21, 2012, the entire contents of which is hereby incorporated by reference.

FIELD OF THE INVENTION

The present invention relates to filter assemblies for removing particles from an air flow, and more particularly to a backing net structure for a filter media, in particular for a pleated filter media in a V-type arrangement.

BACKGROUND OF THE INVENTION

Filter assemblies comprising pleated media packs disposed in a frame structure are known. A pleated filter pack is typically formed from a sheet of filter media, e.g. a fiberglass sheet, or a nonwoven polyester sheet, which is pleated to increase the effective filtering area of the filter body. To provide mechanical support and/or to combine a plurality of media packs, the media pack is typically arranged in a frame structure, such as a frame having a V-type arrangement. In order to enhance the physical properties of pleated filter media, it is known to provide different types of support elements thereto such that deflection during use of the filter media can reduced. Deflection can in a worst case scenario lead to a break of the filter media. But even if it does not come to a breakage of the filter media, deflection thereof causes adjacent filter media to come closer to each other or even come in contact. Both events lead to an increase in pressure drop over the filter since the air cannot flow as intended through there. One example of support is shown in WO-2010/151542 where a flexible but inextensible scrim is attached to a downstream surface of a filter media. While the use of such scrim has advantages over the use of a filter media with no backing at all and prevents deformation of the filter media to a certain extent, it still has some disadvantages. For example, since the scrim is attached to the pleats of the filter media itself, the forces acting on the scrim will be transferred to these pleats which, if it comes to the worst case, may burst thus ruining the filter media.

SUMMARY OF THE INVENTION

It is an object of the present invention to provide an improved backing net which reduces or eliminates the above mentioned and other drawbacks. This object and other objects are achieved by a backing net according to the present invention as defined in the appended claims. This object and other objects are also achieved by a filter media and a V-type filter as defined in the appended claims. Preferred embodiments of the present invention are defined in the dependent claims.

Thus, in accordance with an aspect of the present invention there is provided a backing net for a filter media. The filter media has a longitudinal direction extending along an in depth length of the filter media, i.e. from a filter intake side towards a filter outlet side and a lateral direction extending along a width of the filter media. The backing net comprises a plurality of longitudinal beams and at least one cross beam. Each of the longitudinal beams has a first and a second end and is arranged to extend in the longitudinal direction when the backing net is mounted to the filter media and the cross beam is attached to the longitudinal beams and arranged to extend in the lateral direction when the backing net is mounted to the filter media. The height of at least one of the longitudinal beams varies along the length of the longitudinal beam such that said height is reduced towards the first end thereof. By providing a longitudinal beam having a varying height, a backing net is obtained that has a high degree of rigidity. Since the height of the beam is reduced towards a first end thereof, the backing net still adds very little to the thickness of the filter media. This ensures that the amount of dead area, i.e. areas where the air flow cannot pass through, is reduced to a minimum, thus keeping the pressure drop over the filter assembly low. The area of the point where two adjacent filter medias facing each other meet, i.e. the bottoms and the tops of the V-type arrangement, is determined by the width of the filter media on the one hand and the combined thickness of the two filter media and the two backing nets on the other hand. This area is preferably kept at a minimum since no air can pass through there. Should beams of a uniform height be used that provide sufficient rigidity against deflection, the combined thickness of the filter media and the backing net is increased. The present invention, however, avoids this by providing beams having a varying height along the length thereof.

In accordance with an embodiment of the backing net of the invention, the height of said at least one longitudinal beam is reduced towards the second end thereof. Reducing the height towards both ends reduces consumption of material and can provide a symmetrical backing net which facilitates assembly of filter systems using the backing net by avoiding the risk of mounting the backing net the wrong way round.

In accordance with an embodiment of the backing net of the invention, a side view of said at least one longitudinal beam has at least partially a curved shape.

In accordance with an embodiment of the backing net of the invention, the two outermost longitudinal beams are each provided with a laterally, outwardly extending rib. The lateral rib increases rigidity at the edge of the backing net and allows for the net to be securely attached to for example a frame structure or an edge sealing element together with the filter media, e.g. by adhesive or other suitable molding compound.

In accordance with an embodiment of the backing net of the invention, the laterally, outwardly extending ribs are provided with dovetail slots. The dove tail slots increase the bonding between the backing net and the element to which it is attached, for example a filter frame or an edge sealing element, as the case may be.

In accordance with an embodiment of the backing net of the invention, the two outermost longitudinal beams each comprises a substantially flat rib arranged to extend along a lateral edge of the filter media. This reduces the combined height of the filter media and the backing net along the lateral edges thereof which facilitates the attachment to e.g. a filter frame or edge sealing element as the case may be. Since the deflection of the filter media along the lateral edges thereof is effectively prevented by the filter frame into which the filter media is mounted, the rigidity of the backing net is of less importance here and material can be saved.

In accordance with an embodiment of the backing net of the invention, the substantially flat rib is provided with dovetail slots. The dove tail slots increase the bonding between the backing net and the element to which it is attached, for example a filter frame or an edge sealing element, as the case may be.

In accordance with an embodiment of the backing net of the invention, a width of said at least one longitudinal beam varies along the length thereof. By varying the width of the beam, it is possible to compensate to a certain degree for the reduced height of the beam towards the first end thereof, which reduced height is important for keeping the pressure drop over the filter assembly low as discussed earlier. Even though a reduced thickness of the beam will imply a reduced rigidity against deflection, shear strength of the beam can be upheld by an increased width. Furthermore, the increased width of the beams towards the ends thereof has another advantage. During mounting of the filter medias into the filter frame assembly, it can easily happen that a user by mistake engages with his/her fingers against the filter media which may cause dents in the filter media or even break it. The increased width of the beams towards the ends thereof reduces this risk since this is the area of the filter media where a user will grab hold thereof when mounting it to a filter frame assembly.

In accordance with an embodiment of the backing net of the invention, an abutting surface is provided near an end of said at least one longitudinal beam, said abutting surface extending in a plane normal to a principal plane of the backing net and parallel to a front edge of the backing net. This surface acts as a supporting surface against a frame structure to which the filter media and backing net is attached and provides for increased rigidity.

In accordance with an embodiment of the backing net of the invention, tabs are arranged protruding downwardly along a front and a rear edge of the backing net. The backing net can be slipped on the filter media and the tabs allow securing of the backing net to the filter media in sufficiently strong manner for them to be jointly attached to the filter frame structure.

In accordance with an embodiment of the backing net of the invention, the tabs are arranged to allow the backing net to be stackable. Stackability is desirable in order to facilitate transport and stock-keeping.

In accordance with an aspect of the invention, a filter media having an up-stream surface and a down-stream surface is provided and a backing net as described above is provided on the down-stream surface of the filter media.

In accordance with an aspect of the invention, a V-type filter comprising a plurality of filter media as described above and arranged in a V-type manner is provided.

In accordance with an embodiment of the V-type filter of the invention, dimensions and shapes of the backing net are chosen such that the backing net does not form a restriction of the air flow through the filter in addition to that of the filter media.

BRIEF DESCRIPTION OF THE DRAWINGS

The invention will now be described in more detail and with reference to the appended drawings in which.

DESCRIPTION OF PREFERRED EMBODIMENTS

Figure 1:
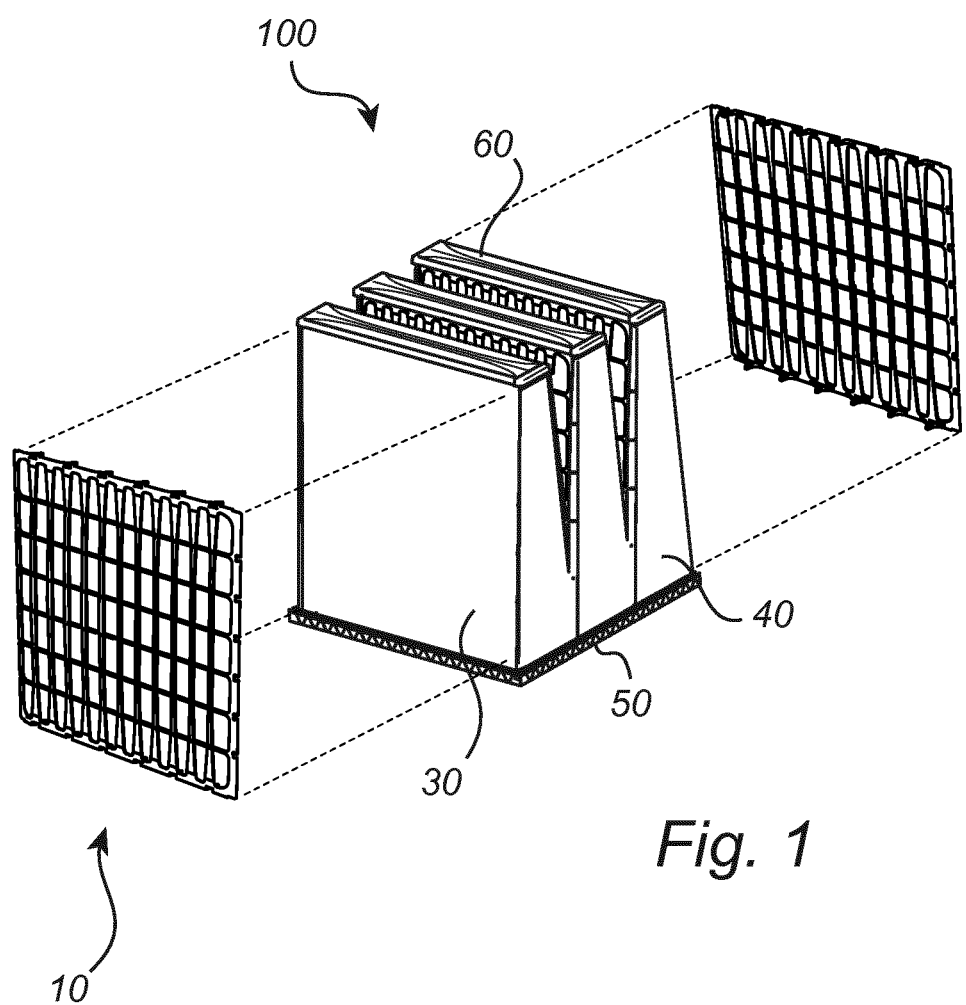
FIG. 1 is a schematic perspective view of an embodiment of a V-type filter of the invention.

The present invention relates to a backing net in filter assemblies for removing particles from an air flow, and more particularly to a backing net structure for a pleated filter media in a V-type arrangement as shown in FIG. 1. Shown therein is an exploded view of an embodiment of a filter assembly 100 of the present invention. The filter assembly 100 includes a frame structure having six filter media 30 arranged therein. The filter media 30 comprises a rectangular pleated media pack, having opposing first and second side edges, and opposing front and rear edges. The media pack is fabricated from a sheet of filter media, made of e.g. a fiberglass sheet, or a nonwoven polyester sheet, which is pleated to increase the effective filtering area of the filter body. The filter assembly 100 is here a frame structure comprising a plurality of frame elements: side panels 40, a top panel 50, and three bottom panels 60. The filter media 30 are stacked in a repeated V-structure within the frame structure, having their opposite side edges arranged facing a respective side panel 40, while at least one of the front and rear ends of each stacked filter media 30 bares against a corresponding front or rear end of an adjacent filter media 30 to form the V-structure. The opposite front and rear ends of the filter media 30 are arranged facing the top panel 50 and one of the bottom panels 60, respectively. Further, when the filter assembly 100 is mounted, the side edges and the front and rear ends of the filter media 30 are sealed against the frame elements 40, 50, 60 of the frame structure, such that substantially all of the air passing through the filter assembly will pass through the filter media 30. Typically the air enters the filter assembly 100 via the top panel 50 and exits the filter assembly 100 at the bottom panels 60.

Figures 2A, 2B:
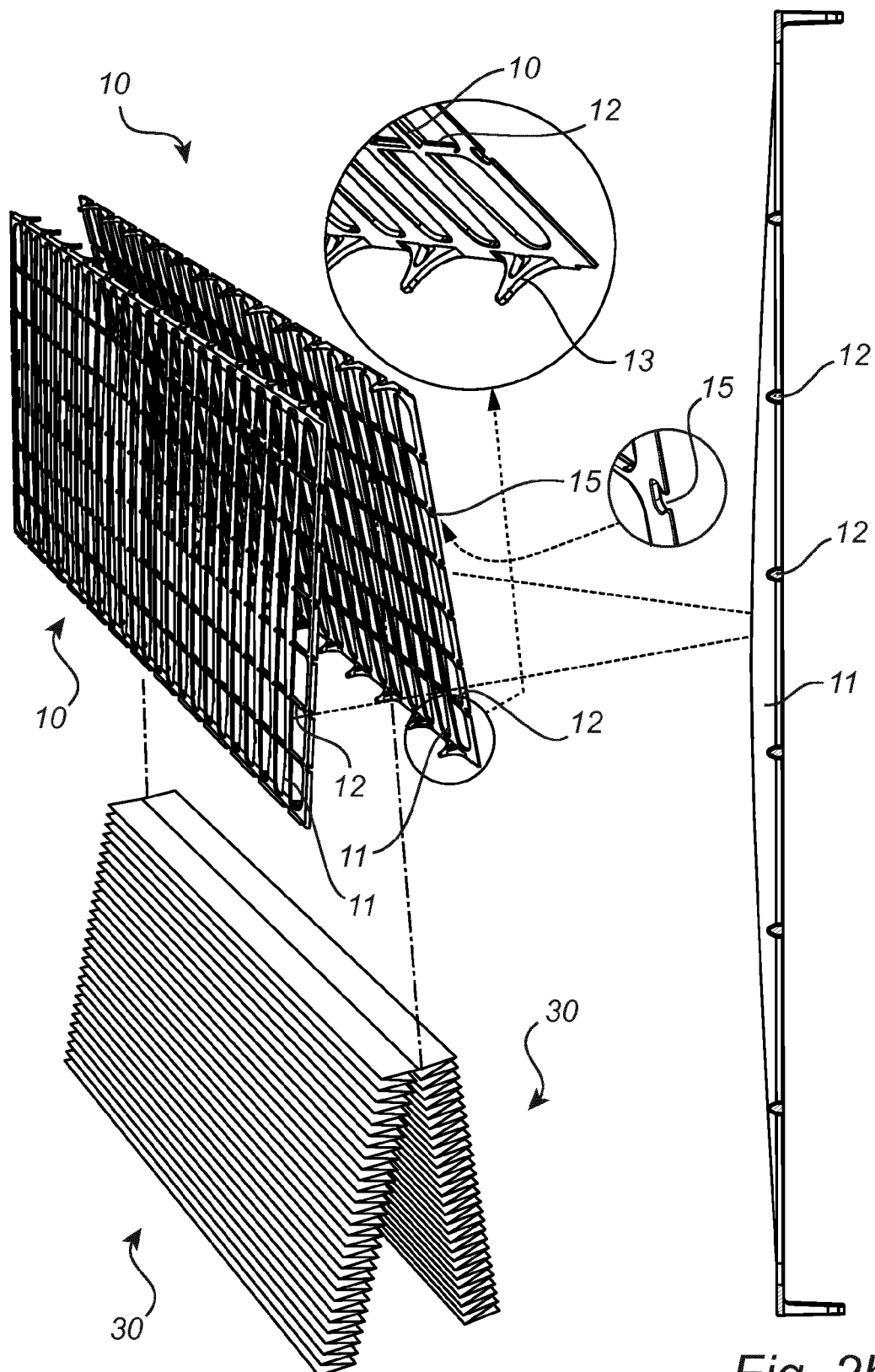
FIG. 2a is a schematic perspective view of an embodiment of the backing net according to the invention.
FIG. 2b is a schematic side view of an embodiment of the backing net according to the invention.

In a first embodiment of a backing net according to the invention, as shown best in FIGS. 2a and 2b, a backing net 10 comprises a number of longitudinal beams 11 and cross beams 12. In contrast to the longitudinal beams or filaments of the prior art, the longitudinal beams 11 according to the present invention have a height that varies over their length. Thereby a backing net 10 is obtained that possesses a high degree of rigidity, especially against deflection. A backing net of this type may have to endure loads of up to 100 kg and in order to avoid that adjacent filter media packs 30 deflects and come too close to each other such that air flow is impeded or even come to break, the backing net 10 need to be as rigid as possible. But at the same time, the combined thickness of filter media 30 and backing net 10 at the front and rear edges, i.e. where adjacent filter media 30 and backing nets 10 come into contact with each other and the top and bottom panels 50, 60 respectively, should be kept as low as possible. This since the area of the bottom panels 60 and the corresponding parts of top panel 50 can be regarded as dead, or restricting, areas when it comes to air flow characteristics. In order to reduce pressure drop over the filter assembly. these areas are to be minimized. Therefore, the reduced height at the ends of the longitudinal beams 10 of the present invention is very favorable in this respect. In FIG. 2a and the enlarged detail thereof, it can be seen that the two outermost longitudinal beams do not have a varying height along their length. Instead, these beams each comprises a substantially flat rib extending along a lateral edge of the filter media 30. The outermost beams are typically not subject to the same forces as the beams 11 towards the central portion of the backing net 10 and do therefore not have to be as rigid as beams 11. Since the backing net 10 is attached to the filter frame structure along the lateral edges, the forces are to a high degree carried by the filter frame. The flat rib may also be provided with dovetail slots 15 in order to increase the adhesive bond between the backing net 10 and the filter frame structure. It is of course possible to use longitudinal beams 11 with varying height also along the lateral edge of the backing net. In this case, a lateral rib may protrude outwardly from the outermost longitudinal beams 11 and may be provided with dovetail slots similar to what is stated above.

In FIG. 2b, a side view of the longitudinal beam 10 is shown. Here it can be seen that the longitudinal beam 10 has an arc shaped upper side which gives the longitudinal beam 10 the favorable characteristics, i.e. high flexural rigidity while still contributing to a low total thickness at the front and rear edges of the filter media 30. Of course, other shapes are conceivable, for example a step-by-step increase in height or a linear increase in height. Cross beams 12 are provided extending between the longitudinal beams 11 in order to avoid or at least minimize tilting and lateral flex of the longitudinal beams 11. Along front and rear edges of the backing net 10, downwardly protruding tabs 13 are provided. These have substantially two functions. Firstly, they allow for the backing net 10 to be temporarily attached to a corresponding filter media 30. The tabs 13 will clasp around the edges of the filter media 30 such that the filter media 30 and the backing net 10 jointly can be attached to the filter frame assembly in a subsequent step. Secondly, the tabs 13 allow for backing nets 10 to be stacked and held in place one on top of the other which is advantageous during transportation and stock keeping.

Figure 2C:
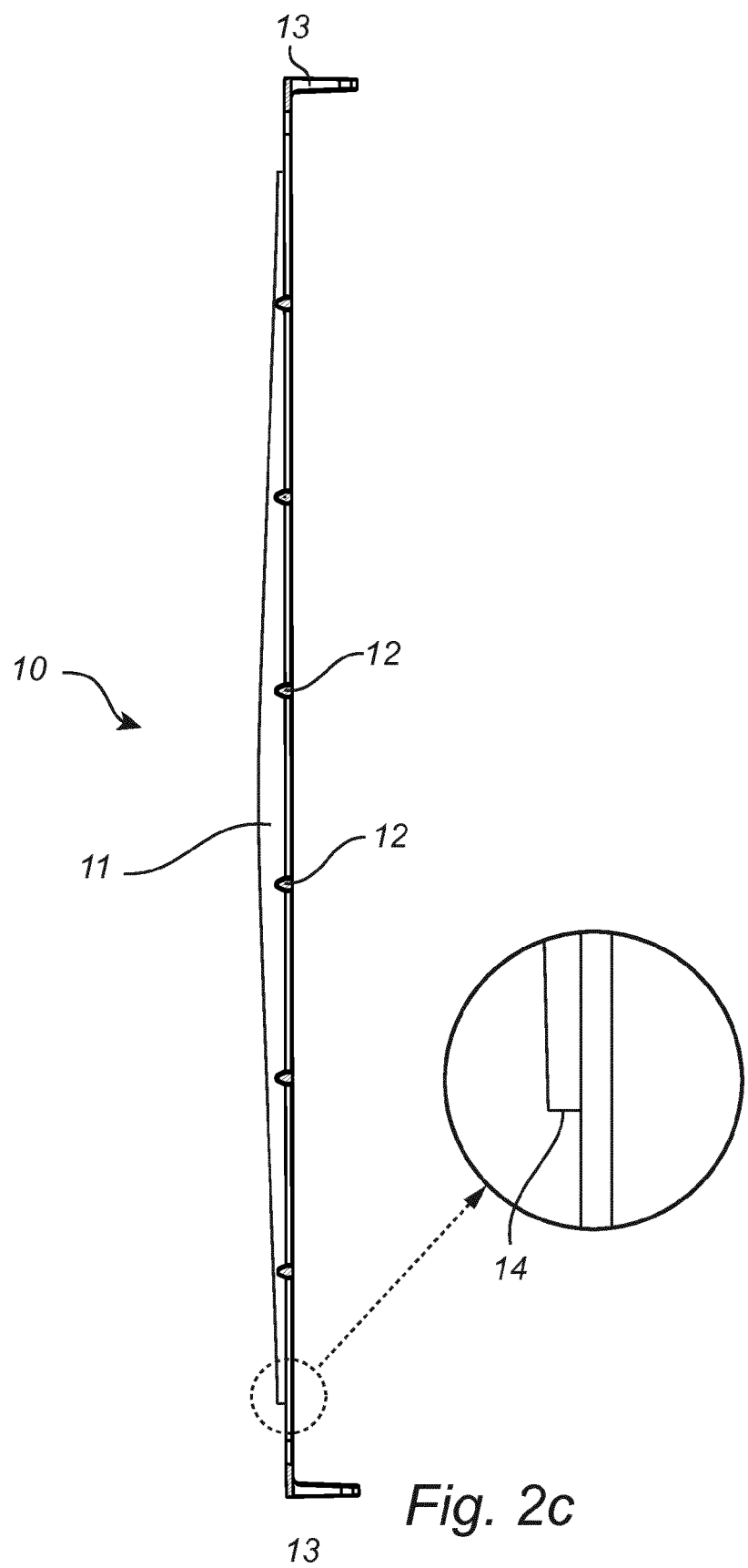
FIG. 2c is a schematic side view of another embodiment of the backing net according to the invention

In FIG. 2c, an alternative embodiment of the backing net 10 according to the invention can be seen. Here, the arc-shaped upper side of the longitudinal beam 10 ends abruptly, thus creating an abutting surface 14. This abutting surface 14 provides for additional structural rigidity of the backing net 10 when inserted into top and bottom panels 50, 60 respectively. Top and bottom panels 50, 60 typically comprises a recess or similar into which the filter media 30 together with backing net 10 is inserted. This recess is subsequently filled with an adhesive in order to create a strong and air tight bond between the separate elements. The abutting surface will then abut a corresponding surface of the top or bottom panel 50, 60 thus enhancing the rigidity of the system. Of course the adhesive can be provided into the recess prior to insertion of the filter media 30 with backing net 10 as well.

Figure 3:
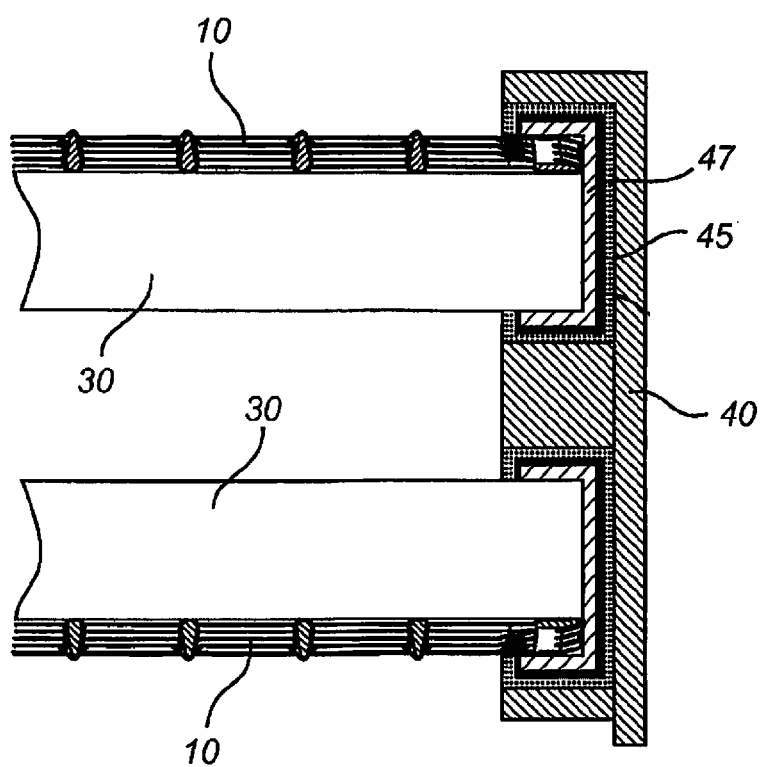
FIG. 3 is a schematic cross-sectional view of a detail of a V-type filter according to the invention.

FIG. 3 shows a cross section of a filter assembly as illustrated in FIG. 1 in which two filter media 30 are arranged in a frame element, here side panel 40. The filter medias are before being emerged in a pot 45 in a first molding step, provided with a backing net 10. The backing net 10 and the filter media 30 are temporarily held together by means of tabs 13, not shown herein. The backing net 10 and filter media 30 are emerged together into the first molding compound layer 47, and subsequently fixated and sealed within the pot 45. The rib extending along the lateral edge of the backing net 10 is thereby sealed in the pot 45 together with the filter media 30 in this first molding step. The provision of the pot 45 further increases the structural rigidity of the filter media 30 and backing net 10 which facilitates the insertion the thus created media packs into the filter frame assembly, i.e. side panel 40, top panel 50 and bottom panel 60. In a second molding step, the filter media 30, backing net 10 and pot 45 are jointly inserted and attached to the filter frame assembly. Preferably the molding compound used in the first and/or second molding step is selected from suitable single or multi-component materials which can be dispensed as a liquid and subsequently be hardened, i.e. cured, such as a material chosen from a group consisting of polyvinylchloride plastisols, polyurethanes epoxies, silicones and ceramics.

Finally, it is realized that the backing net using longitudinal beams having a varying height over the length thereof uses the advantages of having both a thin backing net at the edges thereof for reducing pressure losses over the filter and a more rigid backing net towards a central portion thereof for reducing deflection of the filter media during use.

The invention claimed is:

1. A V-type filter for removing particles from an air flow, the V-type filter comprising:
    a plurality of filter media arranged in a V-type manner, wherein each filter media has an up-stream surface, a down-stream surface, and a backing net on the down-stream surface of each filter media, the filter media including a longitudinal direction extending along an in depth length of the filter media and a lateral direction extending along a width of the filter media, the backing net including
        a plurality of longitudinal beams, the plurality of longitudinal beams including two outermost longitudinal beams and one or more longitudinal beams between the two outermost longitudinal beams, each longitudinal beam of the plurality of longitudinal beams including a first and a second end and being arranged to extend in said longitudinal direction when the backing net is mounted to the filter media; and
        at least one cross beam, the at least one cross beam being attached to the plurality of longitudinal beams and being arranged to extend in said lateral direction when the backing net is mounted to the filter media, wherein at least one longitudinal beam of the plurality of longitudinal beams has a height, in a direction normal to a principal plane of the backing net, that varies along a length of the at least one longitudinal beam such that said height is reduced towards the first end thereof.

2. The V-type filter according to claim 1, wherein the height of the at least one longitudinal beam of the plurality of longitudinal beams is reduced towards the first end thereof and further is reduced towards the second end thereof.

3. The V-type filter according to claim 1, wherein a side view of the at least one longitudinal beam of the plurality of longitudinal beams has a shape of a circular segment.

4. The V-type filter according to claim 1, wherein the two outermost longitudinal beams each include a laterally outwardly extending rib.

5. The V-type filter according to claim 4, wherein the laterally, outwardly extending ribs each include a plurality of dovetail slots, respectively.

6. The V-type filter according to claim 1, wherein the two outermost longitudinal beams each include a substantially flat rib arranged to extend along a lateral edge of the filter media.

7. The V-type filter according to claim 6, wherein the substantially flat rib includes a plurality of dovetail slots.

8. The V-type filter according to claim 1, wherein a width of the at least one longitudinal beam of the plurality of longitudinal beams varies along a length thereof.

9. The V-type filter according to claim 8, wherein the width of the at least one longitudinal beam of the plurality of longitudinal beams increases towards the first end and the second ends of the at least one longitudinal beam.

10. The V-type filter according to claim 1, wherein an abutting surface is near an end of the at least one longitudinal beam of the plurality of longitudinal beams, said abutting surface extending in a plane normal to the principal plane of the backing net and parallel to a front edge of the backing net.

11. The V-type filter according to claim 1, further comprising:
   a plurality of tabs protruding downwardly along a front and a rear edge of the backing net.

12. The V-type filter according to claim 11, wherein the tabs are arranged to allow the backing net to be stackable.

13. The V-type filter according to claim 1, wherein the backing net has a particular dimensions and shapes such that the backing net does not form a restriction of the air flow through the V-type filter in addition to that of the filter media.

\* \* \* \* \*